Patented July 5, 1932

1,866,415

UNITED STATES PATENT OFFICE

EUGENE J. LORAND, OF STATE COLLEGE, PENNSYLVANIA, ASSIGNOR TO THE PENNSYLVANIA STATE COLLEGE, OF STATE COLLEGE, PENNSYLVANIA, A CORPORATION OF PENNSYLVANIA

CONCENTRATED COFFEE PRODUCT AND PROCESS OF PREPARING IT

No Drawing. Application filed June 13, 1928. Serial No. 285,200.

This invention consists in a soluble concentrated coffee product, and in the process of preparing it.

The experience of the art has shown that the characteristic flavoring ingredients of coffee, which give to its pleasing aroma and taste, are due largely to highly volatile substances, which may be conveniently termed "caffeol". The high volatility of the caffeol presents a very serious difficulty in making concentrated coffee extracts. Practically all of the processes of the prior art involve, at some stage, the evaporation of a solvent, which is a serious disadvantage, because at the same time most of the caffeol is thereby lost.

According to this invention, no step involving evaporation is used. Instead, the coffee beans, first roasted and ground, are treated or extracted directly with a liquid or compound which has the properies of absorbing, dissolving and retaining the characteristic ingredients of the coffee, such as caffeol and caffeine. The particular solution used is a mixture of sugars, dissolved in just enough water to hold them in solution. It is desirable to use as small an amount of water as possible, just enough to dissolve the sugars. Water tends to dissolve out acids from the coffee, and so tends to give a bitter taste to the product, which is to be avoided. While various combinations of sugars can be used, the preferred solution of sugars contains one or more of the monosaccharoses, with one or more of the disaccharoses. While these sugar solutions will extract the coffee beans at ordinary temperatures, a somewhat elevated temperature is preferred.

To give a specific example of the process: 230 grams of maltose, 50 grams of lactose, 120 grams of dextrose and 50 grams of mannite are dissolved in about 150 grams of water. This syrup contains only 25% water. Maltose and lactose belong to the group of disaccharose sugars, while dextrose belongs to the group of monosaccharoses. 300 grams of this solution is mixed with 50 grams of ground and freshly roasted coffee and heated for eight hours and filtered. The resulting product has a strong and agreeable flavor, and is readily soluble; when diluted with hot water, it gives a beverage about equal in strength and flavor to the cup of coffee brewed in the usual way. A satisfactory temperature range for this heating is between 70 and 90° C.

In another example of the process, 300 grams of maltose, 200 grams of dextrose, 70 grams of lactose and 50 grams of mannite are dissolved in 150 grams of water. This syrup contains about 19.5% water. This syrup is then mixed with about one sixth its weight of freshly roasted ground coffee and heated for about eight hours at a temperature approximately from 70 to 90° C. The coffee grounds are filtered out. The resulting solution is of satisfactory strength, flavor, solubility and concentration.

As another example of the process, three sugars may be used. For example, 100 grams each of lactose, dextrose and mannite are dissolved in 300 grams of water. About 300 grams of this solution is heated with about 75 grams of freshly ground roasted coffee for about 10 hours at a temperature ranging preferably between 70 and 100° C. The resulting extract, while satisfactory to a degree, is not as strong as when four sugars are used.

The use of a mixture of sugars presents the distinct advantage that they hold each other in solution, and so a very small amount of water is necessary. As already noted, excess water is to be avoided.

The sugars used are edible and remain in and form a part of the resulting final extract. The direct treatment of the coffee grains with an edible solvent which directly absorbs and takes up the caffeol and caffeine gives an extract which, when diluted with hot water, gives a beverage substantially equal in strength and flavor to coffee brewed in the usual way.

The counter-current process may be used in treating the coffee grounds with the mixed sugars. In applying this process, the ground, roasted coffee is in several batches; the mixture of sugars passes successively from one batch of coffee to the next and as it leaves the last batch it has taken up the caffeol and caffeine and other extractable constituents of the coffee. Fresh mixed sugars are introduced into the process by bringing them into contact with that batch of coffee which has been extracted the most number of times, then successively into contact with batches of coffee which have been extracted fewer times, and so contain more coffee.

The concentrated solution leaving the last stage is filtered, preferably in two stages, first through a coarse filter, to remove the coarse particles, and then through a finer filter, preferably a pressure filter, to remove the fine particles.

While the invention has been described in some detail it should be understood that it is not to be limited to these details, but that equivalent steps and materials, instead of the described steps and materials, may be utilized.

Having thus described the invention, what is claimed is:—

1. A concentrated soluble coffee extract having the flavoring ingredients of coffee held in a mixture of sugars.

2. A concentrated soluble coffee extract having the flavoring ingredients of coffee held in a solution of a plurality of sugars.

3. A concentrated soluble coffee extract having the flavoring ingredients of coffee held in a mixture of sugars including a monosaccharose and a disaccharose.

4. A concentrated soluble coffee extract having the essential constituents of coffee, such as the caffeol and caffeine, dissolved in a mixture of monosaccharose and disaccharose sugars, in the presence of a small amount of water.

5. The process of preparing a concentrated soluble coffee extract, comprising directly treating particles of the roasted coffee berry with a solution of a mixture of sugars, which act to catch and retain the characteristic flavoring ingredients of the coffee, the sugars remaining in the extract as part thereof.

6. The process of preparing a concentrated soluble coffee extract, comprising mixing a plurality of sugars together with just enough water so that all dissolve, and directly extracting roasted coffee with such solution, the solution retaining the characteristic flavors and ingredients of the coffee and remaining in the extract as a part thereof.

7. The process of preparing a concentrated soluble coffee extract, comprising roasting the coffee, and directly extracting the roasted coffee with a mixture of sugars in solution, whereby the characteristic flavors of the coffee are retained in the solution, the sugar solution remaining as part of the coffee extract.

8. The process of preparing a concentrated soluble coffee extract, comprising roasting and grinding the coffee, and directly extracting the ground roasted coffee with a mixture of sugars at a temperature between 70° and 90° C. in just enough water so that they are dissolved, whereby the caffeol and caffeine are retained in the solution, the sugars remaining as part of the final extract.

9. The process of preparing a concentrated soluble coffee extract, comprising directly extracting roasted coffee beans with monosaccharose and disaccharose sugars in solution.

10. The process of preparing a concentrated soluble coffee extract, comprising directly extracting roasted coffee beans, at an elevated temperature, with monosaccharose and disaccharose sugars in solution, the solution containing just enough water to dissolve the sugars, the sugars remaining in the extract as a part thereof.

11. The process of preparing a concentrated, soluble coffee extract, comprising treating successive batches of ground roasted coffee with a concentrated solution of mixed sugars by the counter-current process, the sugar solution passing into successive contact with successive batches of coffee, fresh sugar solution being first applied to that batch of coffee which has been extracted the greater number of times, and then being passed into contact successively with successively fresher batches of coffee.

12. The process of preparing a concentrated, soluble coffee extract, comprising treating successive batches of ground roasted coffee with a concentrated solution of mixed monosaccharose and disaccharose sugars by the counter-current process, at a temperature ranging from 70° C. to 90° C., the sugar solution passing into successive contact with successive batches of coffee, fresh sugar solution being first applied to that batch of coffee which has been extracted the greater number of times, and then being passed into contact successively with successively fresher batches of coffee, and filtering the solution from the last stage for removing any coffee grounds, the solution of sugars remaining in the coffee extract as a part thereof.

In testimony whereof I hereunto affix my signature.

EUGENE J. LORAND.